June 24, 1930.   F. SIEBER   1,766,554
DEVICE FOR REGULATING FLOW OF FLUIDS
Filed July 9, 1926
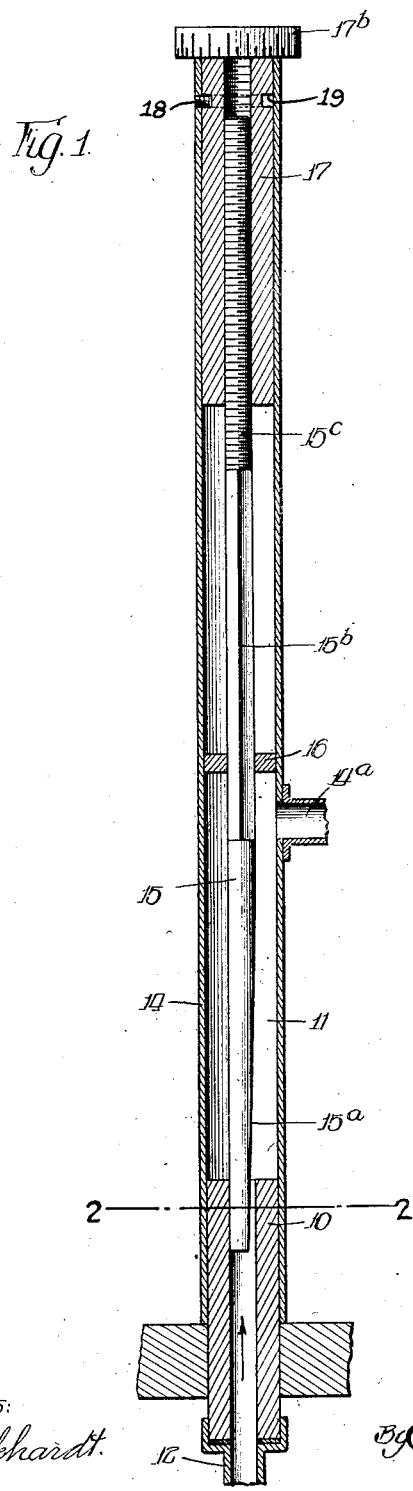
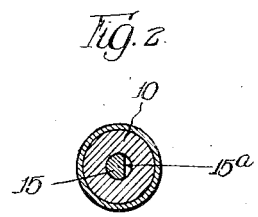

Patented June 24, 1930

1,766,554

UNITED STATES PATENT OFFICE

FRITZ SIEBER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

DEVICE FOR REGULATING FLOW OF FLUIDS

Application filed July 9, 1926, Serial No. 121,338, and in Germany August 13, 1925.

This invention relates to flow regulating apparatus and finds particular utility in the close regulation of the flow of small quantities of gases.

The general purpose of the invention is the provision of apparatus which will be extremely accurate in its regulation of the flow of small quantities, which will facilitate computation of the quantity of flow, and which may be operated with facility.

Another object is the provision of apparatus of the type indicated which will retain its accuracy incident to repeated or extensive use.

Other and further objects will be pointed out or indicated hereinafter, or apparent to one skilled in the art upon an understanding of the invention.

In the drawing forming a part of this specification,

Fig. 1 represents a sectional elevation of an illustrative embodiment of the invention; and Fig. 2 represents a cross-section on substantially line 2—2 of Fig. 1.

While I describe and disclose herein one particular embodiment, it is to be understood that the claims are not to be construed as limited to this form alone, as it is here presented in more or less diagrammatic fashion, for purpose of illustration only.

In apparatus utilized for the regulation of the flow of small quantities of gases from one vessel to another, various forms of aperture-controlling devices, such as needle valves, have been employed. Such arrangements, however, are not sufficiently accurate for the extremely close and accurate adjustments and computations necessitated incident to various tests of high vacuum apparatus and the like, such as for the calibration of high vacuum pumps. The nature of the present invention will be ascertained immediately from the illustrative disclosure herein contained, wherein it will be observed that the reference numeral 10 designates a tube having a cylindrical bore and placed in communication at one end with a chamber or receptacle 11 and at the other end with a chamber or receptacle 12, from one to the other of which chambers the flow of gas is to take place. The chamber 11 may be formed by a tube 14 having a connection 14ª to atmosphere or to another vessel in which case the chamber 12 is the one being evacuated, the flow of fluid taking place in the direction of the arrow shown.

Arranged for cooperation with the flow tube 10 is an adjustable member 15 in the nature of a rod, one end portion of which is adapted to make close surface fit with the wall of the bore of the tube 10. Said end portion of the rod is formed on one side with a flat or bevel 15ª on a very small angle or pitch with respect to the axis of the rod. The rod also has a square portion 15ᵇ and a threaded portion 15ᶜ. The square portion is adapted for longitudinal travel in a guide 16, supported on the tube 14, whereby the rod is held against rotation. Rotatably mounted on the tube 14 is the adjusting nut 17 which receives with screw engagement the threaded portion of the rod, said nut having a manipulative portion 17ᵇ whereby it may be rotated to effect longitudinal adjustment of the rod. Suitable calibrating marks may be associated with the nut 17, from which the position or adjustment of the rod relative to the tube 10 may be determined. The inner end of a suitable screw stud 18 fixed with respect to the tube 14 is received by an annular recess 19 in the nut 17 and cooperates with the latter to prevent axial movement of the same with respect to the tube while permitting freely of rotation of the nut with respect to the tube. It is of advantage that the bevel 15ª be less in width than the diameter of the rod, so that the cylindrical surface of the latter will always make an air-tight fit with the surface of the bore of the tube 10.

It will be observed that by virtue of this arrangement a segment-shaped flow passage is provided through the flow tube 10, the size of which flow passage may be varied by longitudinal adjustment of the rod, and may be accurately computed for any position of the rod, so that very accurate calibration of the device may be made. Due to the exact fit of rod 15 in the bore of tube 10, the upper unbevelled portion of the rod is effective to close the bore completely such as to prevent any fluid-flow even under high-vacuum conditions in chamber 12. Such complete closure of the bore of tube 10, it will be apparent, takes place upon manipulation of nut 17 such as to move rod 15 downwardly by such amount that the lower bevelled end portion 15ª is entirely within the bore. Because of the very fine adjustment obtainable with the screw and the extremely minute variations in size of the flow passage accruing from longitudinal adjustment of the rod, the device is particularly qualified for the making of very fine and very accurate measurements.

What I claim is:

1. In a device of the character described, cooperating elements adjustable with respect to each other and being operable upon such adjustment to provide a fluid opening of varying dimension, one of said elements being provided with a smooth cylindrical bore, the other of said elements being provided throughout a portion of its length with a smooth cylindrical surface fitting said bore with air-tight exactness and being beveled at one end on a small angle for a portion of its length, said elements being operable when in a given position with respect to each other to completely close such opening by virtue of the exact fit between their respective cylindrical configurations, said second-named element being provided with a threaded portion, means holding said second-named element against rotary movement, and means for effecting adjustment of said elements with respect to each other, said adjusting means including a nut engaging said threaded portion, said nut being supported for rotary movement about the axis of said second-named element and held against longitudinal movement with respect to said device.

2. In a device of the character described, cooperating elements adjustable with respect to each other and being operable upon such adjustment to provide a fluid opening of varying dimension, one of said elements being provided with a smooth cylindrical bore, the other of said elements being provided throughout a portion of its length with a smooth cylindrical surface fitting said bore with air-tight exactness and being beveled at one end on a small angle for a portion of its length, said elements being operable when in a given position with respect to each other to completely close such opening by virtue of the exact fit between their respective cylindrical configurations, said second-named element being provided with a threaded portion, means holding said second-named element against rotary movement, and means for effecting adjustment of said elements with respect to each other, said adjusting means including a nut engaging said threaded portion, said nut being supported for rotary movement about the axis of said second-named element and held against longitudinal movement with respect to said device, said adjusting means further including calibrated means for indicating adjustments of said elements with respect to each other.

In testimony whereof I have hereunto subscribed my name at Zurich, Switzerland, on the 22nd day of June, A. D. 1926.

FRITZ SIEBER.